100 # United States Patent Office 2,910,347
Patented Oct. 27, 1959

2,910,347

PREPARATION OF LITHIUM NITRIDE

Donald L. Esmay, Minneapolis, Minn., assignor to Lithium Corporation of America, Inc., Minneapolis, Minn., a corporation of Minnesota No Drawing. Application July 6, 1956
Serial No. 596,150

13 Claims. (Cl. 23—191)

My invention is directed to a new and improved process for the preparation of lithium nitride. Lithium nitride is useful in the flash-brazing of copper; for the removal of occluded hydrogen from aluminum castings; and as a reducing agent. Methods which have heretofore been suggested in the art for the preparation of lithium nitride have been cumbersome and inconvenient to carry out and the quality of the finished product has left much to be desired.

In accordance with my invention, a new and useful, and easily and conveniently carried out, process has been developed wherein essentially pure, crystalline lithium nitride is readily produced, and the process can be carried out nicely at atmospheric pressure and at relatively low temperatures. The process of my invention admits, also, as will be apparent in the light of the following description, of being carried out either semi-continuously or continuously.

In its broadest aspects, the process of my invention involves initially providing a dispersion of metallic lithium in an inert liquid medium, the metallic lithium being in the form of particles having an average size in the critical range, and then passing gaseous nitrogen into said dispersion, after which the lithium nitride which is produced is recovered from the reaction mixture. It is important to the success of my process that the average size of the particles of metallic lithium dispersed in the inert liquid medium be not greater than a certain critical value, which depends upon the precise manner in which the process is carried out. If this critical value is exceeded, then the reaction with the nitrogen, under the conditions involved in the process, will not take place or will take place inadequately so that the desired production of lithium nitride does not occur. While, as stated, the critical particle size, on the average, is somewhat variable depending upon the particular conditions under which the process is carried out, nevertheless, in general, the critical range will usually fall within the range of about 100 to about 200 microns for the diameters of the lithium particles. In most instances, it is desired to operate the process under such conditions that the average particle size diameters of the lithium will be under 100 microns.

The process can be carried out under a wide range of temperatures, for instance, from about 25 to about 350 degrees C., but, generally speaking, it is especially desirable to operate in the range of 180 to 250 degrees C., and more especially, in the range of 180 to 210 degrees C.

While my process may be carried out under either subatmospheric or superatmospheric pressures, it is unnecessary to resort to such procedures because, in its most advantageous aspect, considering such matters as convenience of operation and simplicity of equipment, the process is best carried out at atmospheric pressures.

In carrying out the process of my invention, a dispersion of metallic lithium, such as molten metallic lithium, is made in an inert liquid medium, advantageously within the preferred temperature ranges described above. When the molten lithium particles become sufficiently small, under the conditions under which the process is carried out, as hereinafter described, namely, by agitation, so that the critical range of particle size is reached, reaction takes place immediately between gaseous nitrogen bubbled through the dispersion and the exceedingly small particles of metallic lithium which, as stated above, are of such size as to fall within the aforementioned critical range. The reaction between the metallic lithium and the nitrogen is an exothermic reaction. By proper adjustment of the flow of gaseous nitrogen, the reaction rate can be so regulated that the heat evolved by reason of said exothermic reaction is just sufficient to maintain the mixture at the desired reaction temperature.

The process of my invention can be so carried out as to provide for extremely simple separation of the desired lithium nitride from the unreacted lithium metal in the dispersion in the inert liquid medium. Lithium metal has a density of only 0.53, and lithium nitride has a density of about 1.3. Hence, if an inert liquid medium is employed whose density lies between the above two values, then, at the end of the reaction, the unreacted lithium metal will float to the top and the desired lithium nitride will settle to the bottom of the dispersion when said dispersion is allowed to remain quiescent. Thus, the unreacted lithium metal can be removed by decanting the dispersion after settling, or the lithium nitride can be drawn off from the bottom.

The wide difference in densities between the lithium metal and the lithium nitride can be taken advantage of in connection with carrying out the reaction in the form of a continuous process. For instance, the process can be carried out in a reactor of such design that the molten lithium, the inert liquid medium, and the gaseous nitrogen are continuously charged into an upper dispersion area below which is a baffled settling area so that as the lithium nitride is formed in the dispersion area it settles out into the bottom of the settling area from where it can be continuously withdrawn.

The inert liquid medium in which the metallic lithium is dispersed can be selected from any one of a number of available materials. Such materials must be liquid at the particular reaction temperature utilized and, of course, must not react with either the lithium metal or the lithium nitride which is formed in the process. Generally speaking, I find it especially advantageous to utilize inert liquid hydrocarbons. Typical of suitable inert liquid media are mineral oils whose boiling point is advantageously above 200 degrees C., petrolatum, paraffin wax, tetrahydronaphthalene, and, in general, aliphatic, araliphatic or aromatic compounds, particularly hydrocarbons, with boiling points of at least 200 degrees C. and advantageously higher.

The proportions of metallic lithium and inert liquid medium, or the ratios of metallic lithium to inert liquid medium, are quite variable but, in general, the metallic lithium should constitute from about 5 to about 40%, by weight, or from about 6 to 50% by volume, and especially from about 10 to about 25%, by weight, of the total mixture, that is, the dispersion of the metallic lithium in the inert liquid medium. It is particularly desirable to employ relatively lower amounts of metallic lithium to inert liquid medium since this facilitates rapid separation of the formed lithium nitride.

The rate of addition of the gaseous nitrogen is variable, the optimum depending upon the specific type of apparatus employed, the particular inert liquid medium utilized, the concentration of the lithium metal in the dispersion, and on a number of other factors. Generally speaking, the rate of gaseous nitrogen addition is ordinarily governed by the extent to which the heat evolved by formation of the lithium nitride is dissipated.

The following example is illustrative of the practice of the process of my invention. It will be understood, however, that it is not to be construed as in any way limitative of the full scope of the invention since various changes can be made, without departing from the spirit of the teachings contained herein, in the light of the guiding principles which I have set forth above.

*Example*

450 grams of a mineral oil, in this instance a product sold by Standard Oil Company of Indiana under the name "Superla White Mineral Oil #10," was charged to a conventional resin flask having a glass top and a one liter stainless steel bottom portion and equipped with a Weston dial-type stainless steel thermometer, a stainless steel propeller-type stirrer attached to a high speed (18,000 r.p.m.) motor, and nitrogen inlet and outlet tubes. The mineral oil was maintained under a blanket of nitrogen. After heating it to about 150 degrees C., 35 grams of lithium metal were added. The mixture was then heated until the lithium metal melted (about 180 degrees C.) and slow stirring was initiated. While maintaining the nitrogen blanket over the mixture and the temperature at about 185 to 190 degrees C., the stirring rate was gradually increased until a speed of 9,000 r.p.m. was reached. Under these conditions, the particle size of the molten metallic lithium was in the critical range and was found to be somewhat under an average diameter of 100 microns. Gaseous nitrogen was passed into the dispersion just below the surface thereof at the rate of about 6 bubbles per second. The reaction between the particles of lithium metal and the gaseous nitrogen manifested itself by virtue of an increase in the temperature of the reaction mixture, without supplying any added heat thereto, and the fact that the nitrogen failed to flow out of the apparatus. The stirring was continued at about 9,000 to 10,000 r.p.m. and the temperature maintained at about 195 to 200 degrees C. by applying heat only intermittently. The uptake of nitrogen was sufficiently rapid for about 45 minutes to keep the apparatus under a slight vacuum, after which the nitrogen began to flow slowly out of the outlet tube. Stirring was continued, at the aforesaid 9,000 to 10,000 r.p.m., for an additional 20 minutes after which said stirring was discontinued and the mixture allowed to cool to room temperature under a slow flow of gaseous nitrogen.

The final reaction mixture was then poured into jars and allowed to stand whereupon a layer of solid formed on the bottom and a small amount of unreacted metallic lithium floated to the top. The solid layer at the bottom was removed and, upon examination, was found to consist of nicely crystalline, deep-red particles none of which had a diameter greater than 100 microns and with most having diameters of about 10 to about 75 microns. The product was vigorously active to water and moderately active to methanol. In the latter reaction, the odor of ammonia was very pronounced. Analysis showed that said product, as separated from the reaction mixture as described above, is a highly pure crystalline substance, to wit, lithium nitride. It can, if desired, be even further purified by known techniques.

What I claim as new and desire to protect by Letters Patent of the United States is:

1. A process of preparing lithium nitride which comprises providing a dispersion of liquid metallic lithium in a liquid hydrocarbon medium inert to liquid metallic lithium, the metallic lithium being in the form of particles having an average size in the critical range, then passing gaseous nitrogen into said dispersion, and recovering the lithium nitride therefrom.

2. A process of preparing lithium nitride which comprises providing a dispersion of liquid metallic lithium in a liquid hydrocarbon medium inert to liquid metallic lithium, the metallic lithium being in the form of particles having an average size in the critical range, generally not exceeding a diameter of about 100 microns, then passing gaseous nitrogen into said dispersion, while maintaining the latter at a temperature in the range of 25 to 350 degrees C., and recovering the lithium nitride therefrom.

3. A process of preparing lithium nitride which comprises providing a dispersion of liquid metallic lithium in a liquid hydrocarbon medium inert to liquid metallic lithium, the metallic lithium being in the form of particles having an average size in the critical range, generally not exceeding a diameter of about 100 microns, then passing gaseous nitrogen into said agitated dispersion while maintaining the latter at a temperature in the range of 180 to 250 degrees C., said reaction being carried out at atmospheric pressure, and recovering the lithium nitride.

4. A process of preparing lithium nitride which comprises providing a dispersion of liquid metallic lithium in a liquid hydrocarbon medium inert to liquid metallic lithium, said inert liquid hydrocarbon medium having a density intermediate between the density of metallic lithium and the density of lithium nitride, the metallic lithium being in the form of particles having an average size in the critical range, then passing gaseous nitrogen into said dispersion, and recovering the lithium nitride therefrom.

5. A process of preparing lithium nitride which comprises providing a liquid hydrocarbon medium inert to liquid metallic lithium, adding metallic lithium thereto, maintaining the metallic lithium in a liquid state in said inert liquid hydrocarbon medium, agitating the resulting dispersion of liquid metallic lithium in said inert liquid hydrocarbon medium whereby to convert said metallic lithium to an average particle size in the critical range, passing gaseous nitrogen into said dispersion while maintaining said metallic lithium particles in the critical range, and recovering the lithium nitride from said dispersion.

6. A process of preparing lithium nitride which comprises providing a liquid mineral oil medium, adding metallic lithium thereto, maintaining the metallic lithium liquid in said mineral oil, agitating the resulting dispersion of liquid metallic lithium in said mineral oil whereby to convert said metallic lithium to an average particle size in the critical range, passing gaseous nitrogen into said dispersion while maintaining said metallic lithium particles in the critical range and while maintaining said dispersion at a temperature in the range of 180 to 250 degrees C., said process being carried out at substantially atmospheric pressure, and recovering the lithium nitride from said dispersion.

7. A process of preparing lithium nitride which comprises providing a liquid mineral oil medium, adding metallic lithium thereto, maintaining the metallic lithium liquid in said mineral oil, agitating the resulting dispersion of liquid metallic lithium in said mineral oil whereby to convert said metallic lithium to an average particle size in the critical range, generally not exceeding a diameter of about 100 microns, passing gaseous nitrogen into said dispersion while maintaining said dispersion at a temperature in the range of 180 to 250 degrees C., said process being carried out at substantially atmospheric pressure, and recovering the lithium nitride from said dispersion.

8. A process in accordance with claim 1, wherein the metallic lithium in said dispersion is present in proportions in the range of 5 to 40 parts of metallic lithium in each 100 parts of the total mixture, by weight.

9. A process in accordance with claim 2, wherein the metallic lithium in said dispersion is present in proportions in the range of 5 to 40 parts of metallic lithium in each 100 parts of the total mixture, by weight.

10. A process in accordance with claim 5, wherein the metallic lithium in said dispersion is present in proportions in the range of 5 to 40 parts of metallic lithium in each 100 parts of the total mixture, by weight.

11. A process in accordance with claim 3, wherein the metallic lithium in said dispersion is present in proportions in the range of 10 to 25 parts of metallic lithium in each 100 parts of the total mixture, by weight.

12. A process in accordance with claim 6, wherein the metallic lithium in said dispersion is present in proportions in the range of 10 to 25 parts of metallic lithium in each 100 parts of the total mixture, by weight.

13. A process in accordance with claim 7, wherein the metallic lithium in said dispersion is present in proportions in the range of 10 to 25 parts of metallic lithium in each 100 parts of the total mixture, by weight.

References Cited in the file of this patent

UNITED STATES PATENTS

| | | |
|---|---|---|
| 2,467,647 | Alexander | Apr. 19, 1949 |
| 2,660,514 | Rohrman | Nov. 24, 1953 |